United States Patent [19]
Morcos

[11] Patent Number: 5,345,206
[45] Date of Patent: Sep. 6, 1994

[54] MOVING COIL ACTUATOR UTILIZING FLUX-FOCUSED INTERLEAVED MAGNETIC CIRCUIT

[75] Inventor: Anthony C. Morcos, Oceanside, Calif.

[73] Assignee: Bei Electronics, Inc., San Francisco, Calif.

[21] Appl. No.: 75,345

[22] Filed: Jun. 10, 1993

Related U.S. Application Data

[63] Continuation of Ser. No. 980,754, Nov. 24, 1992, abandoned.

[51] Int. Cl.$^5$ .................... H01F 7/08; H02K 41/00
[52] U.S. Cl. ........................... 335/222; 310/13
[58] Field of Search ............... 335/148–150, 335/220, 222–224, 229–235; 381/199–201; 310/13; 336/110

[56] References Cited

U.S. PATENT DOCUMENTS

| | | | |
|---|---|---|---|
| 3,013,189 | 12/1961 | Bernier | 335/222 |
| 3,201,529 | 8/1965 | Surh | 335/222 |
| 4,318,038 | 3/1982 | Munehiro | 310/13 |
| 4,407,578 | 10/1983 | Petersen | 310/13 |
| 4,439,700 | 3/1984 | Menzel et al. | 310/13 |
| 4,649,359 | 3/1987 | Doki et al. | 335/222 |
| 4,692,999 | 9/1987 | Frandsen | 310/13 |
| 4,808,955 | 2/1989 | Godkin et al. | 335/222 |

*Primary Examiner*—Leo P. Picard
*Assistant Examiner*—Raymond Barrera
*Attorney, Agent, or Firm*—Limbach & Limbach

[57] ABSTRACT

A cylindrically-symmetrical moving coil linear actuator utilizes axially-magnetized cylindrical magnets to provide flux-focused interleaved magnetic circuits. The moving coil linear actuator includes a cylindrical shell that has a closed end and open end. A magnetic core is disposed within the shell to define an annular air gap between the shell and the core. The core includes a first set of axially-magnetized cylindrical permanent magnets having a first direction of magnetization and disposed in proximity to the closed end of the shell. A second set of axially-magnetized cylindrically permanent magnets has a second direction of magnetization which is opposite of the first direction of magnetization and is disposed in proximity to the open end of the shell. A first ferro-magnetic pole piece is disposed between the first set of magnets and the second set of magnets. A second ferro-magnetic pole piece is disposed between the second set of magnets and the open end of the shell. A moving coil assembly is disposed within the annular air gap. The coil assembly includes a non-magnetic coil carrier disposed within the air gap. A first coil winding is formed on the coil carrier in proximity to the first set of magnets and is wound to have a first polarity. A second coil winding is formed on the coil carrier in proximity to the second set of magnets and is wound to have a second polarity opposite to the first polarity such that the first and second coil windings are wound in series opposition.

34 Claims, 3 Drawing Sheets

MOVING COIL ACTUATOR UTILIZING FLUX-FOCUSED INTERLEAVED MAGNETIC CIRCUIT

This is a continuation of co-pending application Ser. No. 07/980,754, filed on Nov. 24, 1992, now abandoned.

BACKGROUND OF THE INVENTION

1. Field of the Invention

The present invention relates to linear actuators and, in particular, to a moving coil actuator that utilizes the interaction of axially-magnetized permanent magnets assembled in opposition to provide the desired air gap flux density.

2. Discussion of the Prior Art

U.S. Pat. No. 4,808,955 issued to Mikhail Godkin and Jack Kimble on Feb. 28, 1989, and commonly assigned herewith to BEI Electronics, Inc., discloses a moving coil linear actuator that utilizes the interaction of magnetic circuits to provide a desired air gap flux density.

As shown in FIG. 1, the Godkin/Kimble linear actuator 10 includes a cylindrical core 12 and a shell 14 which is disposed around the core 12 to define an annular space between the inner wall of the shell 14 and the outer wall of the core 12. A non-magnetic spacer 16 is mounted in the annular space, at the actuator's longitudinal midpoint, to define a shell and core arrangement for back-to-back linear actuators. A first set of magnets 22, 24, 26, 28 is mounted within an annular cavity 18 of what is illustrated in FIG. 1 as the "right-hand" actuator. (Although one skilled in the art will understand that each magnet shown in FIGS. 1–3 has both a North Pole (N) and a South Pole (S), for clarification purposes it is noted that the "N" and "S" designations utilized in FIGS. 1–3 indicate the pole facing the annular cavity.)

More specifically, an annular magnet 22 of a certain polarity, shown as North (N) in FIG. 1, is mounted on the inner wall of the shell 14 adjacent to the spacer 16. An annular magnet 24 of a polarity opposite to that of magnet 22, i.e. South (S) in FIG. 1, is mounted on the inner wall of the shell 14 in proximity to the open end of the cavity 18. Magnet 24 is spaced apart from and is one-half the length of magnet 22. A third annular magnet 26 of a polarity opposite to that of magnet 22 is mounted on the outer wall of the core 12 in proximity to the spacer 16. Magnet 26 is the same length as and is mounted in longitudinal correspondence with magnet 22. A fourth annular magnet 28 of a polarity opposite that of magnet 24 is mounted in spaced apart relation from magnet 26 on the outer wall of the core 12 in proximity to the open end of the cavity 18. Magnet 28 is the same length as and is mounted in longitudinal correspondence with magnet 24.

Thus, magnets 22 and 26 define an "inner" pair of magnets for the first actuator, while magnets 24 and 28 define an "outer" pair of magnets for the first actuator.

As further shown in FIG. 1 a second set of magnets, similar to the first set, is mounted within an annular cavity 20 of what is illustrated in FIG. 1 as a second "left-hand" actuator. The second set of magnets includes an annular magnet 30, of opposite polarity to that of magnet 22, which is mounted on the inner wall of the shell 12 adjacent to the spacer 16. An annular magnet 32 of a polarity opposite to that of magnet 30 is mounted on the inner wall of the shell 12 in proximity to the open end of the cavity 20. Magnet 32 is spaced apart from and is one-half the length of magnet 30. An annular magnet 34 of a polarity opposite to that of magnet 30 is mounted on the outer wall of the core 12 in proximity to the spacer 16. Magnet 34 is the same length as and is mounted in longitudinal correspondence with magnet 30. An annular magnet 36 of opposite polarity to that of magnet 32 is mounted in spaced apart relation from magnet 34 on the outer wall of the core 12 in proximity to the open end of the cavity 20. Magnet 36 is the same length as and is mounted in longitudinal correspondence with magnet 32.

Thus, magnets 30 and 34 define an "inner" pair of magnets for the second actuator, while magnets 32 and 36 define an "outer" pair of magnets for the second actuator.

The arrangement of magnets in the manner shown in FIG. 1 results in the definition of three magnetic circuits. A first magnetic circuit is defined by magnets 22, 24, 26 and 28. Similarly, a second magnetic circuit is defined by magnets 30, 32, 34 and 36. Additionally, the "inner" magnets of the two above-defined sets, i.e magnets 22 and 26 of the first set and magnets 30 and 34 of the second set, interact to provide a third magnetic circuit. That is, a third "interleaved" magnetic circuit is defined by the interaction of magnets 22, 26, 30 and 34. The flux lines of the third, interleaved magnetic circuit also pass through the core element 12 and the shell 14 and the two air gaps such that the core 12 and the shell 14 carry only one-third of the total flux, thereby reducing the flux of the first two magnetic circuits.

FIG. 2 shows a double-ended moving coil linear compressor which utilizes the above-described magnetic circuit arrangement. Like elements in FIGS. 1 and 2 are similarly identified.

In the FIG. 2 embodiment, the material used for each of the magnets is Neodymium-Iron-Boron. The core 12 and the shell 14 are formed from cold rolled steel. The non-ferromagnetic material is that conventionally utilized in this type of device, e.g. type 300-series stainless steel or aluminum.

As shown in FIG. 2, in addition to the magnetic circuit arrangement shown in FIG. 1, the double-ended moving coil linear compressor further includes a coil assembly 38 which is movably disposed within the air gap of the first actuator. The coil assembly 38 includes a first coil winding 42 and a second coil winding 44 which is spaced apart from the first winding 42. Both winding 42 and 44 are connected to an appropriate electrical power supply. Winding 44 is twice the length of winding 42, the lengths and spacing of windings 42 and 44 corresponding to the lengths and spacing of the corresponding inner and outer pairs of magnets 24, 28 and 22, 26, respectively. Windings 42 and 44 are wound on the assembly 38 so that current flow in the two windings is in opposite directions to correspond to the polarities of the associated magnets 24, 28 and 22, 26, respectively. A first piston 46, which is attached to coil assembly 38, is slidably mounted within a piston chamber 48 formed in the core 12. A discharge port 49 provides fluid communication between the piston chamber 48 and the external environment through the core wall, spacer 16 and shell 14.

As further shown in FIG. 2, a second coil assembly 50, which is identical to the coil assembly 38 described above, is movably disposed within the air gap of the second actuator. The coil assembly 50 includes a coil winding 54 and a coil winding 56 which is spaced apart from winding 54 and is twice its length, the length and spacing of windings 54 and 56 corresponding to the lengths and spacing of the inner and outer pairs of corresponding magnets 30, 34 and 32, 36, respectively. Both windings 54 and 56 are connected to an appropriate electrical power supply. Windings 54 and 56 are wound on the assembly 50 so that current flow in the two windings is in opposite directions to correspond to the polarities of the associated magnets 32, 36 and 30, 34 respectively. A piston 58, which is attached to coil assembly 50, is slidably mounted within the piston chamber 48.

Thus, when current flow in the coil windings 42, 44 and 54, 56, magnetic fields are created in interact with the fields generated by the corresponding magnetic circuits, causing linear motion of the coil assemblies 38 and 50 with attendant reciprocating motion of pistons 46 and 48, respectively.

An alternative "single-ended" embodiment of a linear actuator which utilizes the above-described concepts is shown in FIG. 3.

The single-ended moving coil linear actuator 100 shown in FIG. 3 comprises a core 102 and a shell 104 which is disposed around the core 102 to define an annular space between the inner wall of the shell 104 and the outer wall of the core 102. A wall 106 of magnetic material is formed between the inner wall of the shell 104 and the outer wall of the core 102 to define an annular cavity 108 having a closed end adjacent the magnetic wall 106 and an open end. A set of magnets is mounted within the annular cavity 108 to define an air gap. A first annular magnet 110 of a certain polarity is mounted on the inner wall of the shell 104 in proximity to, but spaced apart from the magnetic wall 106. A second annular magnet 112 of opposite polarity to that of the first magnet 110 is mounted on the inner wall of the shell 104 in proximity to the open end of the cavity 108. The second magnet 112 is spaced apart from the first magnet 110. The length of the first magnet 110 is twice that the second magnet 112; that is, magnet 110 comprises two-thirds of the total length of the two magnets 110, 112 while magnet 112 comprises one-third of the total length. A third annular magnet 114 of the same polarity as magnet 112 is mounted on the outer wall of the core 102 in proximity to, but spaced apart from the magnetic wall 106. Magnet 114 is the same length as and is mounted in longitudinal correspondence with magnet 110. A fourth annular magnet 116 of the same polarity as magnet 110 is mounted on the outer wall of the core 102 in proximity to the open end of the cavity 108. Magnet 16 is spaced apart from magnet 114; it is the same length as and is mounted in longitudinal correspondence with magnet 112.

The single-ended moving coil linear actuator 100 shown in FIG. 3 further includes a coil assembly 118 which is movably disposed within the air gap 108. The coil assembly 118 includes a first coil winding 120 which is longitudinally disposed in the air gap between the first magnet 110 and the third magnet 114. A second coil winding 122, which is spaced apart from the first coil 120, is longitudinally disposed in the air gap between the second magnet 112 and the fourth magnet 116. Winding 120 is twice the length of winding 122, the lengths and spacing of the windings 120 and 122 corresponding to the lengths and spacing of the corresponding inner and outer pairs of magnets 110, 114 and 112, 116, respectively. Windings 120 and 122 are wound on the assembly 118 so that current flow in two windings is in opposite directions.

SUMMARY

The present invention provides a cylindrically-symmetrical moving coil linear actuator that utilizes axially-magnetized cylindrical magnets to provide flux-focused interleaved magnetic circuits. The moving coil linear actuator includes a cylindrical shell that has a closed end and an open end. A magnetic core is disposed within the shell to define an annular air gap between the shell and the core. The core includes a first set of axially-magnetized cylindrical permanent magnets having a first direction of magnetization and disposed in proximity to the closed end of the shell. A second set of axially-magnetized cylindrically permanent magnets having a second direction of magnetization which is opposite to the first direction of magnetization is disposed in proximity to the open end of the shell. A first ferro-magnetic pole piece is disposed between the first set of magnets and the second set of magnets. A second ferro-magnetic pole piece is disposed between the second set of magnets and the open end of the shell. A moveable coil assembly disposed within the annular air gap includes a coil carrier disposed within the air gap, a first coil winding formed on the coil carrier in proximity to the first set of magnets and wound to have a first polarity, and a second coil winding formed on the coil carrier in proximity to the second set of magnets and wound to have a second polarity opposite to the first polarity.

A flux focused, interleaved magnetic circuit in accordance with the present invention has a number of advantages over standard magnetic circuit configurations that are commonly employed in voice coil actuators. The most significant such advantage is that the actuator can be made longer axially by adding more magnet, pole piece and coil sets of alternating polarity without having to increase the outer diameter of the steel shell.

Furthermore, there are several unique features of the above-described flux focused, interleaved magnetic circuit which give this configuration advantages over other magnetic designs. In its cylindrical form, the permanent magnets are in the shape of discs. This geometry is the most easily produced magnet shape, especially for the sintered rare earth magnet materials which are the recommended materials for these designs. Also, this geometry allows the designer to place the maximum amount of permanent magnet material in a given actuator volume, thereby providing an increase in generated magnetic flux which leads to improved actuator operating efficiency. By choosing the pole piece, magnet and coil winding axial lengths and the air gap and steel shell annular thickness properly, voice coil actuators with previously-impossible volumetric efficiencies can be created.

A better understanding of the features and advantages of the present invention will be obtained by reference to the following detailed description and accompanying drawings which set forth an illustrative embodiment in which the principles of the invention are utilized.

DETAILED DESCRIPTION OF THE INVENTION

Figure 1:
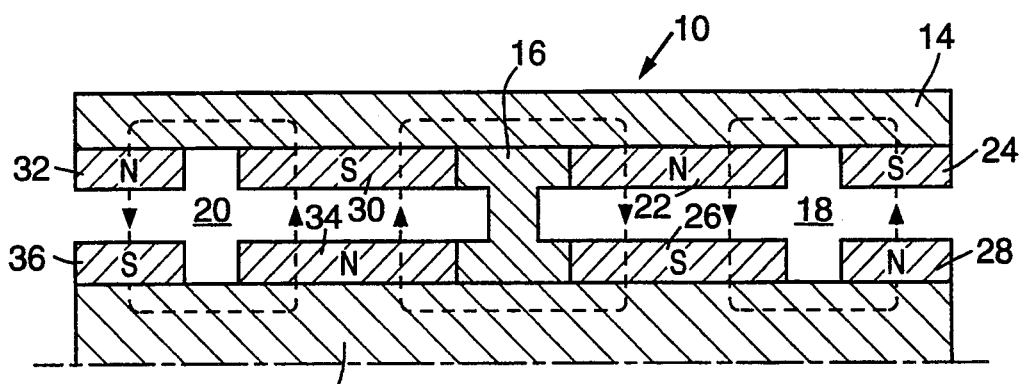
FIG. 1 is a half cross-sectional schematic diagram illustrating the magnetic circuit arrangement of a known double-ended moving coil linear actuator.
Figure 2:
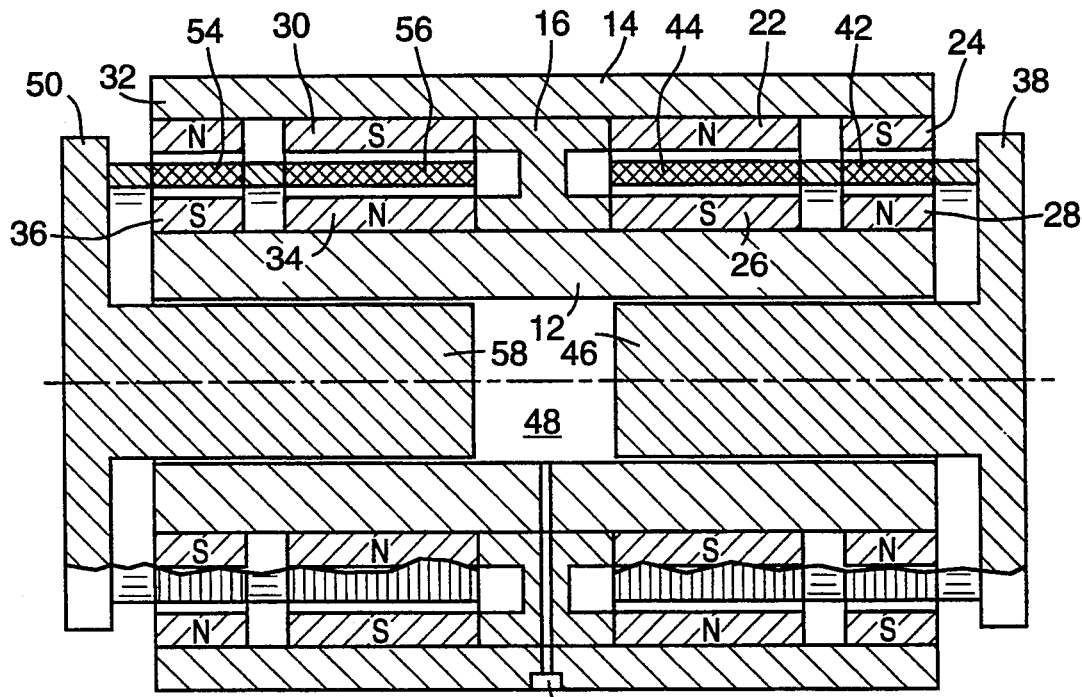
FIG. 2 is a partially cut-away schematic diagram illustrating a double-ended linear compressor that utilizes the magnetic circuit arrangement shown in FIG. 1.
Figure 3:
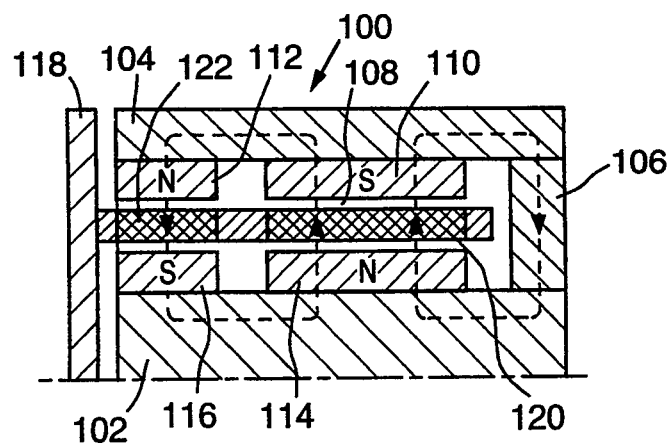
FIG. 3 is a schematic diagram illustrating the magnetic circuit arrangement of a known single-ended moving coil linear actuator.
Figure 4:
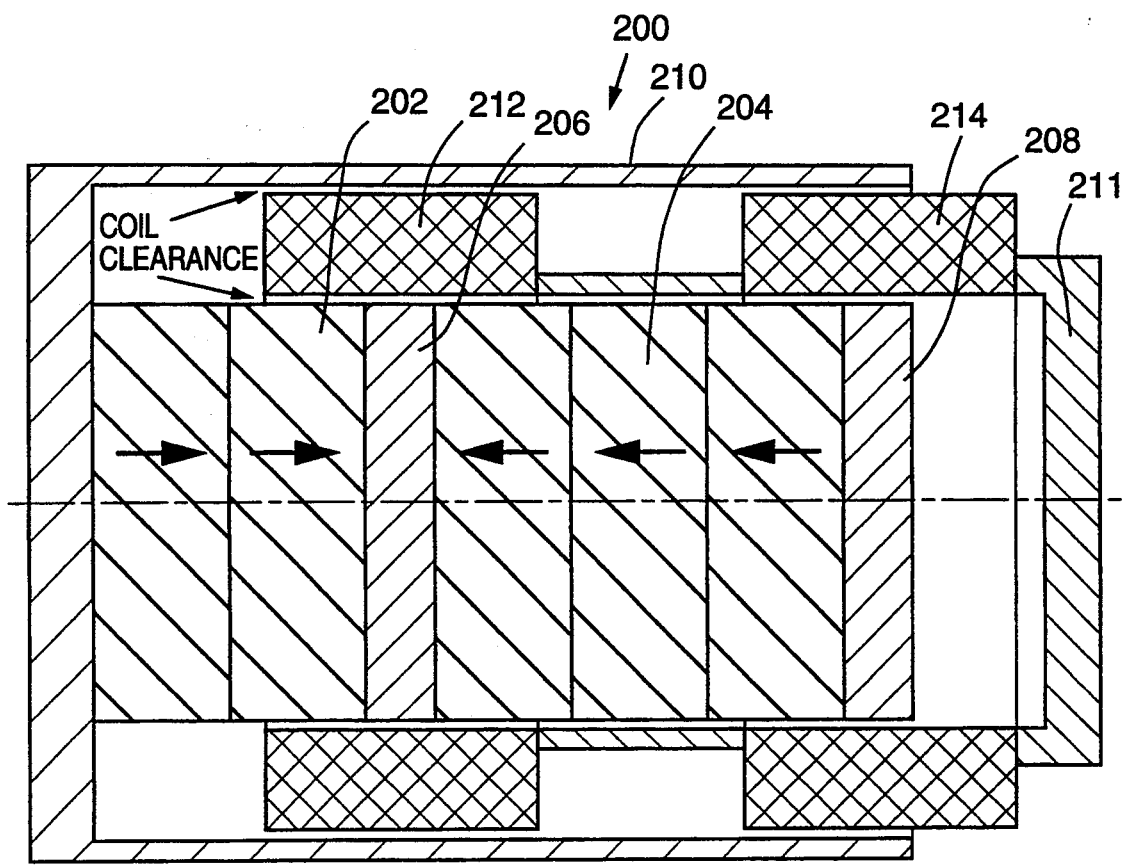
FIG. 4 is a schematic diagram illustrating a cylindrically-symmetric linear actuator utilizing a flux focused, interleaved magnetic circuit in accordance with the present invention.

FIG. 4 shows a cylindrically-symmetric moving coil linear actuator 200 in accordance with the present invention. The linear actuator 200 includes two sets 202, 204 of axially-magnetized cylindrical permanent magnets assembled in opposition, and separated by a ferromagnetic pole piece 206. The set 204 of permanent magnets closest to the open end of the actuator 200 is capped by another ferromagnetic pole piece 208. The cylindrical magnet/pole piece assembly is inserted into a steel shell 210 which provides the necessary magnetic flux return path.

The permanent magnets are all high coercive force magnets that is, hard ferrites or high energy rare earth magnets (e g. $SmCO_5$, $Sm_2CO_{17}$, $Nd_2Fe_{14}B$) in sintered and bonded forms.

The pole pieces can be any high-permeability ferromagnetic material. Typically, these materials are iron alloys such as cold-rolled steel, vanadium permendur and 400-series stainless steel.

Figure 5:
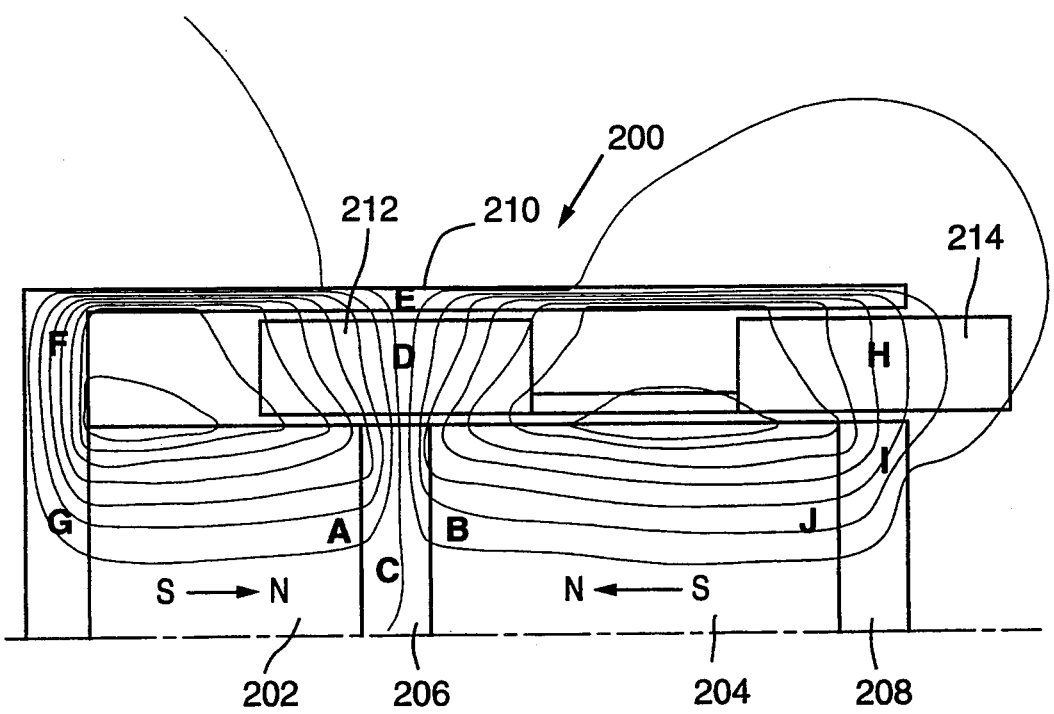
FIG. 5 is a half schematic diagram illustrating the FIG. 4 linear actuator and including magnetic flux paths characterizing the FIG. 4 linear actuator design.

FIG. 5 is a computer-generated plot depicting the magnetic flux paths which characterize the design of the actuator 200. Letters in parentheses (e.g. "(A)") are used in FIG. 5 to designate locations in the FIG. 4 design.

Referring to FIGS. 4 and 5, the north poles (A and B) of both magnet sets 202, 204 feed flux to the innermost pole piece 206 (C). The flux then jumps across the innermost air gap, threading through a first coil winding 212 (D) that is mounted on a non-magnetic coil carrier 211 disposed in the air gap between the magnetic core assembly and the shell 210. This flux produces an axial force upon coil 212 per the Loreritz Force Principle. After radially traversing the first air gap, the magnetic flux enters the steel shell 210 (E) and splits, with approximately half of this flux returning to the south pole side of the inner magnet set 202 (G) through the base of the steel shell 210 (F). The other half of the magnetic flux travels axially along the shell 210 toward the open end of the actuator 200. It then flows radially across the outer most air gap and threads a second coil winding 214 (H), returning to the south pole of the outer magnet set 204 (J) via the outer pole piece 208 (I).

Because the polarity of the magnetic field threading the first coil 212 is opposite to that threading the second coil 214, the two coils 212, 214 must be wound in series opposition so as to produce an additive axial force.

The coil windings are copper or aluminum magnet wire with non-electrically-conducting insulation.

The coil carrier is a non-ferromagnetic "bobbin" made from fiberglass, paper or plastic or from non-magnetic metals such as aluminum, titanium or 300-series stainless steel. If a metallic coil carrier is used, then it must be electrically insulated to prevent the coil winding from shorting to the carrier.

Figure 6:
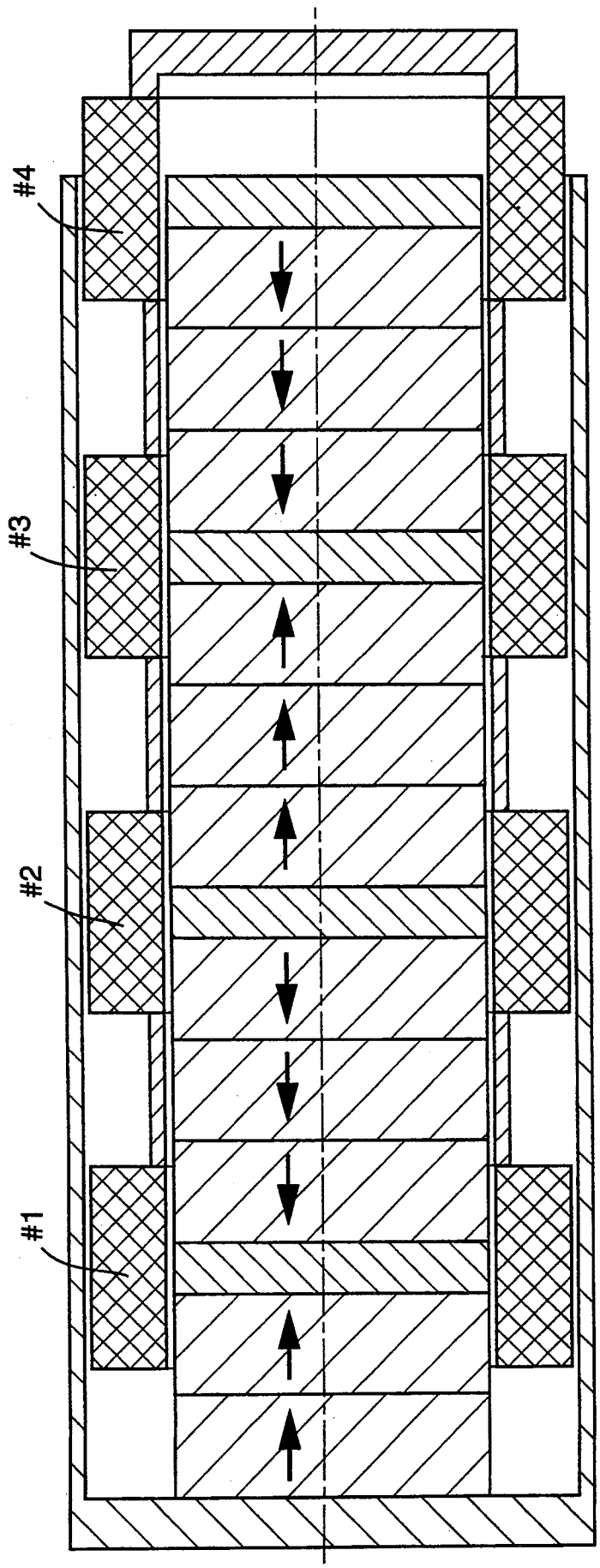
FIG. 6 is a schematic diagram illustrating a cylindrically-symmetric linear actuator in accordance with the present invention and utilizing a flux focused, interleaved magnetic circuit with multiple sets of magnets, pole pieces and coils.

An infinite number of magnets, pole pieces, and coil windings can be added to the open end of the actuator 200, provided that magnetic polarities and coil winding directions are properly chosen. FIG. 6 shows a flux focused, interleaved magnetic circuit with four sets of magnets, pole pieces and coils.

As illustrated in FIG. 5, the innermost magnet set feeds only one air gap, while all other magnet sets progressing toward the open end of the actuator must feed two air gaps. Therefore, the innermost magnet set can be made shorter than the other sets. In the preferred embodiment, the innermost magnet set should be one-half to three-quarters as long as the subsequent sets.

Furthermore, the pole piece axial length should be made short enough to drive the steel into saturation at its outer diameter. This has two desirable effects. First, the coil inductance is kept lower when the pole pieces are saturated. Second, the trumpeting effect of the flux lines provides a rather high flux density over an axially-long air gap. The coil windings' axial lengths should be made longer than the pole piece length so as to fully utilize this flux-trumpeting effect while accommodating the required axial stroke of the actuator. The steel shell should be made thin enough to drive the steel into saturation if coil inductance and total weight are to be minimized.

As shown in FIGS. 4 and 6, each magnet set can be composed of several segments, as long as the segments are placed in series, i.e. north pole against south pole. This is especially useful in the preferred embodiment in which rare earth permanent magnets are employed, because such magnets are generally manufactured with diameters exceeding their axially length. Thus, the stroke, force, and axial length of an actuator design can be easily varied by adding or subtracting magnetic segments.

It should be understood that various alternatives to the embodiments of the invention described herein may be employed in practicing the invention. For example, while FIGS. 4 and 6 illustrate "sets" of multiple, cylindrical magnets arranged in series, it is intended that the term "set" include a single axially-magnetized cylindrical permanent magnet. Thus, it is intended that the following claims define the scope of the invention and that methods and apparatus within the scope of these claims and their equivalents be covered thereby.

What is claimed is:

1. A moving coil linear actuator comprising:
   a cylindrical shell having a closed end and an open end;
   a core disposed within the shell to define an annular air gap therebetween, the core including first axially-magnetized cylindrical permanent magnet means having a first direction of magnetization and disposed in proximity to the closed end of the shell, second axially-magnetized cylindrical permanent magnet means having a second direction of magnetization opposite to the first direction of magnetization and disposed in proximity to the open end of the shell, a first ferro-magnetic pole piece disposed between the first magnet means and the second magnet means, and a second ferro-magnetic pole piece disposed between the second magnet means and the open end of the shell; and a coil assembly movably disposed within the annular air gap and connectable to an electrical power supply, the coil assembly including a coil carrier disposed within the annular air gap, a first coil winding formed on the coil carrier in proximity to the first magnet means and wound to have a first polarity, and a second coil winding formed on the coil carrier in proximity to the second magnet means and wound to have a second polarity opposite to the first polarity such that the first and second coil windings are wound in series opposition.

2. A moving coil linear actuator as in claim 1 wherein the first magnet means comprises a first plurality of disc-shaped permanent magnets placed in series and the second magnet means comprises a second plurality of disc-shaped permanent magnets placed in series.

3. A moving coil linear actuator as in claim 1 wherein the first magnet means is shorter in the axial direction than the second magnet means.

4. A moving coil linear actuator as in claim 3 wherein the first magnet means is one-half to three-quarters as long as the second magnet means.

5. A moving coil linear actuator comprising:
a cylindrical shell having a closed end and an open end;
a core disposed within the shell to define an annular air gap therebetween, the core including a plurality of sets of axially-magnetized cylindrical permanent magnets separated from one another by ferro-magnetic pole pieces and having alternating directions of magnetization, the sets of magnets including an innermost magnet set disposed in proximity to the closed end of the shell and an outermost magnet set disposed in proximity to the open end of the shell, the outermost magnet set having a ferro-magnetic pole piece disposed between said outermost magnet set and the open end of the shell; and
a coil assembly movably disposed within the annular air gap, the coil assembly including a coil carrier disposed within the annular air gap and a plurality of coil windings formed on the coil carrier in axial correspondence to the plurality of sets of magnets, being wound to have alternating polarities such that adjacent coil windings are wound in series opposition, and connectable to an electrical power supply.

6. A moving coil linear actuator as in claim 5 wherein each of the plurality of sets of magnets comprises a plurality of disc-shaped permanent magnets placed in series.

7. A moving coil linear actuator as in claim 5 wherein the innermost magnet set is shorter in the axial direction than the remainder of the plurality of sets of magnets.

8. A moving coil linear actuator as in claim 7 wherein the innermost magnet set is one-half to one-third as long as the remainder of the plurality of sets of magnets.

9. A moving coil linear actuator as in claim 5 wherein the magnets are rare earth magnets.

10. A moving coil linear actuator as in claim 5 wherein the magnets are rare earth magnets selected from the group consisting of $SmCO_5$, $Sm_2CO_{17}$ and $Nd_2Fe_{14}B$.

11. A moving coil linear actuator as in claim 5 wherein the pole pieces are iron alloys.

12. A moving coil linear actuator as in claim 5 wherein the pole pieces are iron alloys selected from the group consisting of cold-rolled steel, vanadium permendur and 400-series stainless steel.

13. A moving coil linear actuator as in claim 5 wherein the coil windings are copper or aluminum magnet wire having non-electrically conducting insulation formed thereon.

14. A moving coil linear actuator as in claim 5 wherein the coil carrier comprises a nonferromagnetic material.

15. A moving coil linear actuator as in claim 14 wherein the coil carrier comprises a nonferromagnetic material selected from the group consisting of fiberglass, paper and plastic.

16. A moving coil linear actuator as in claim 5 wherein the coil carrier comprises a non-magnetic metal.

17. A moving coil linear actuator as in claim 16 wherein the coil carrier comprises a non-magnetic metal selected from the group consisting of aluminum, titanium or 300-series stainless steel.

18. A moving coil actuator comprising:
a shell having a closed end and an open end;
a core disposed within the shell to define an air gap therebetween, the core including first axially-magnetized permanent magnet means having a first direction of magnetization and disposed in proximity to the closed end of the shell, second axially-magnetized permanent magnet means having a second direction of magnetization opposite to the first direction of magnetization and disposed in proximity to the open end of the shell, a first ferro-magnetic pole piece disposed between the first magnet means and the second magnet means, and a second ferro-magnetic pole piece disposed between the second magnet means and the open end of the shell; and
a coil assembly movably disposed within the air gap and connectable to an electrical power supply, the coil assembly including a coil carrier disposed within the gap, a first coil winding formed on the coil carrier in proximity to the first magnet means and wound to have a first polarity, and a second coil winding formed on the coil carrier in proximity to the second magnet means and wound to have a second polarity opposite to the first polarity such that the first and second coil windings are wound in series opposition.

19. A moving coil actuator as in claim 18 wherein the first magnet means comprises a first plurality of permanent magnets placed in series and the second magnet means comprises a second plurality of permanent magnets placed in series.

20. A moving coil actuator as in claim 18 wherein the first magnet means is shorter in the axial direction than the second magnet means.

21. A moving coil actuator as in claim 20 wherein the first magnet means is one-half to three-quarters as long as the second magnet means.

22. A moving coil actuator comprising:
a shell having a closed end and an open end;
a core disposed within the shell to define an air gap therebetween, the core including a plurality of sets of axially-magnetized permanent magnets separated from one another by ferro-magnetic pole pieces and having alternating directions of magnetization, the sets of magnets including an innermost magnet set disposed in proximity to the closed end of the shell and an outermost magnet set disposed in proximity to the open end of the shell, the outermost magnet set having a ferro-magnetic pole piece disposed between said outermost magnet set and the open end of the shell; and a coil assembly movably disposed within the air gap, the coil assembly including a coil carrier disposed within the air gap and a plurality of coil windings formed on the coil carrier in axial correspondence to the plurality of sets of magnets, being wound to have alternating polarities such that adjacent coil windings are wound in series opposition, and connectable to an electrical power supply.

23. A moving coil actuator as in claim 22 wherein each of the plurality of sets of magnets comprises a plurality of permanent magnets placed in series.

24. A moving coil actuator as in claim 22 wherein the innermost magnet set is shorter in the axial direction than the remainder of the plurality of sets of magnets.

25. A moving coil actuator as in claim 24 wherein the inner most magnet set is one-half to one-third as long as the remainder of the plurality of sets of magnets.

26. A moving coil actuator as in claim 22 wherein the magnets are rare earth magnets.

27. A moving coil actuator as in claim 22 wherein the magnets are rare earth magnets selected from the group consisting of $SmCO_5$, $Sm_2CO_{17}$ and $Nd_2Fe_{14}B$.

28. A moving coil actuator as in claim 22 wherein the pole pieces are iron alloys.

29. A moving coil actuator as in claim 22 wherein the pole pieces are iron alloys selected from the group consisting of cold-rolled steel, vanadium permendur and 400-series stainless steel.

30. A moving coil actuator as in claim 22 wherein the coil windings are copper or aluminum magnet wire having non-electrically conducting insulation formed thereon.

31. A moving coil actuator as in claim 22 wherein the coil carrier comprises a non-ferromagnetic material.

32. A moving coil actuator as in claim 31 wherein the coil carrier comprises a non-ferromagnetic material selected from the group consisting of fiberglass, paper and plastic.

33. A moving coil actuator as in claim 22 wherein the coil carrier comprises a non-magnetic metal.

34. A moving coil actuator as in claim 33 wherein the coil carrier comprises a non-magnetic metal selected from the group consisting of aluminum, titanium or 300-series stainless steel.

* * * * *